United States Patent
Hunn et al.

(10) Patent No.: US 12,524,609 B2
(45) Date of Patent: *Jan. 13, 2026

(54) MACHINE LEARNING BASED INSTANTIATION OF DOCUMENTS BASED ON TEMPLATES IN A DOCUMENT MANAGEMENT SYSTEM

(71) Applicant: DocuSign, Inc., San Francisco, CA (US)

(72) Inventors: Peter Geoffrey Lerato Hunn, San Francisco, CA (US); Parsa Pezeshki, Brooklyn, NY (US); Diana R. Lease, Brooklyn, NY (US); Brandon Scott Somers, Renton, WA (US)

(73) Assignee: Docusign, Inc., San Francisco, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 18/370,717

(22) Filed: Sep. 20, 2023

(65) Prior Publication Data

US 2024/0111948 A1 Apr. 4, 2024

Related U.S. Application Data

(63) Continuation of application No. 17/956,461, filed on Sep. 29, 2022, now Pat. No. 11,797,760.

(51) Int. Cl.
*G06F 40/174* (2020.01)
*G06F 16/93* (2019.01)
*G06F 40/186* (2020.01)

(52) U.S. Cl.
CPC .......... *G06F 40/186* (2020.01); *G06F 16/93* (2019.01)

(58) Field of Classification Search
CPC ....... G06F 40/186; G06F 16/93; G06F 40/197
See application file for complete search history.

(56) References Cited

U.S. PATENT DOCUMENTS

| | | | |
|---|---|---|---|
| 6,684,188 B1 * | 1/2004 | Mitchell | G06F 40/174 715/810 |
| 9,122,669 B2 * | 9/2015 | Demant | G06F 40/186 |

(Continued)

FOREIGN PATENT DOCUMENTS

| | | | | |
|---|---|---|---|---|
| CN | 112115695 A | * | 12/2020 | |
| CN | 113779952 A | * | 12/2021 | G06F 40/174 |

OTHER PUBLICATIONS

International Search Report and Written Opinion for International Application No. PCT/US2023/033730, filing date Sep. 26, 2023, 8 pages.

(Continued)

*Primary Examiner* — Hassan Mrabi
(74) *Attorney, Agent, or Firm* — KDW FIRM PLLC

(57) ABSTRACT

A system, for example, a document management system stores documents and manages workflows associated with documents. The document management system allows discovery of templates based on explicit searches performed by users or automatic searches performed based on a context. The document management system allows generating new document templates based on selected versions of document component templates. The generated document template may be stored as a new version. The document management system instantiates documents based on templates by predicting values of variables used in the template based on various factors that describe the context in which the template is being used. The values used for instantiating variables may be generated using machine learning models that may be trained using historical data stored in the document management system.

20 Claims, 8 Drawing Sheets

(56) References Cited

U.S. PATENT DOCUMENTS

| | | | |
|---|---|---|---|
| 9,953,007 B2 | 4/2018 | Oyarzabal | |
| 10,268,668 B1* | 4/2019 | West | G06F 40/174 |
| 11,245,592 B1 | 2/2022 | Thomson | |
| 11,880,650 B1* | 1/2024 | Li | G06F 40/174 |
| 2008/0098918 A1* | 5/2008 | Rees | G06F 40/186 |
| | | | 101/483 |
| 2008/0104082 A1* | 5/2008 | Gimson | G06F 40/186 |
| 2008/0104493 A1* | 5/2008 | Rees | G06F 40/186 |
| | | | 715/200 |
| 2008/0104504 A1* | 5/2008 | Gimson | G06F 40/186 |
| | | | 715/234 |
| 2008/0104508 A1* | 5/2008 | Lumley | G06F 40/186 |
| | | | 715/255 |
| 2010/0058169 A1* | 3/2010 | Demant | G06F 40/186 |
| | | | 715/234 |
| 2017/0177699 A1* | 6/2017 | Chan | G06F 16/986 |
| 2017/0316355 A1 | 11/2017 | Shrestha | |
| 2018/0018322 A1* | 1/2018 | Mukherjee | G06F 8/30 |
| 2018/0032497 A1* | 2/2018 | Mukherjee | G06F 40/253 |
| 2019/0155894 A1 | 5/2019 | Gandhi | |
| 2021/0357584 A1 | 11/2021 | Chen | |
| 2023/0274084 A1* | 8/2023 | Modani | G06F 40/174 |
| | | | 715/243 |

OTHER PUBLICATIONS

International Preliminary Report on Patentability for International Application No. PCT/US2023/033730, filing date Sep. 26, 2023, 7 pages.

* cited by examiner

MACHINE LEARNING BASED INSTANTIATION OF DOCUMENTS BASED ON TEMPLATES IN A DOCUMENT MANAGEMENT SYSTEM

CROSS-REFERENCE TO RELATED APPLICATIONS

This application is a continuation of U.S. application Ser. No. 17/956,461, filed Sep. 29, 2022, which is hereby incorporated by reference in its entirety.

TECHNICAL FIELD

The disclosure generally relates to the field of document management, and specifically to creation, storage, and instantiation of templates associated with documents used in workflows executed by a document management system.

BACKGROUND

Online document management systems are used for creating and reviewing documents. These systems provide users with tools to edit, view, and execute the documents. Online document management systems are increasingly using cloud-based solutions that allow participants to perform collaborations based on online documents. Use of online techniques such as electronic signatures allows efficient execution of these workflows. These workflows may involve different types of documents depending on various factors including the participants of the workflow, the step of the workflow being executed, the location or resource in which the workflow is being executed, and so on. Preparing a document for use in a particular step of a document-based workflow typically involves experts. Delays in preparing the document affect the execution of the workflow and slows down the overall execution of the workflow.

SUMMARY

A system, for example, a document management system manages templates associated with documents. A template includes text of a document and variables that can be replaced with values. The system stores templates received from users, generates new templates, and instantiates documents or document components from templates by determining values of variables used in templates.

According to an embodiment, the document management system stores a set of documents. Each document comprises a set of document components. Examples of document components include clauses, verifications, and actions but are not limited to these. The document management system stores a repository of document templates and document component templates. Each document template is associated with a document type determined based on the document content. The repository stores a set of versions of document templates for each document type. A document component has a document component type and a document component template is associated with a document component type. The repository further stores a set of versions of document component templates for each document component type. A version of a document template or a document component template is associated with a context determined based on various factors including, information describing a document workflow being executed by the document management system and information describing participants of the document workflow.

According to an embodiment, the document management system determines a matching version of a template by comparing the current context with contexts associated with each stored version of the template. A context may include information describing the participants of a document workflow, for example, a category of an organization represented by a participant. The context may include information describing the document workflow being executed, for example, information identifying a step of the document workflow being currently executed or one that may subsequently be executed. The document management system may represent a context as a feature vector. For example, the feature vector may represent embeddings generated by a neural network receiving the context as input. Two contexts are determined to match based on a comparison of the corresponding feature vector representations. For example, the document management system may determine a vector distance between the two feature vectors and use the vector distance to determine whether the corresponding templates match.

According to an embodiment, the document management system selects a version of a document or a document template applicable to a particular context while executing a document workflow. The document management system receives information describing a current document workflow being executed. The current document workflow may have one or more participants. The document management system determines a current context based on the current document workflow and the participants of the current document workflow. The system identifies a document type relevant to the current document workflow. The document management system compares the context associated with the version of the document template of the document type with the current context. The document management system selects a version of a document template of the document type if the context associated with the version of the document template matches the current context. The document template is used to obtain a document, for example, based on user feedback or automatic generation. The document management system executes subsequent steps of the document workflow using the document.

According to an embodiment, the document management system generates document templates for use in a document workflow. The document management system receives information describing a document workflow being executed. The document management system identifies a document type for use in the document workflow. The document management system receives a request for generating a document template of the document type. The request may be received from a user or automatically generated by the document management system, for example, based on the current step of a document workflow being executed. The document management system identifies one or more component types of components of a document of the document template type. For each component type identified, the system selects a version of a document component template of the document component type. The selection of the version of the document component may be based on the search process described above, for example, based on matching of the contexts. The document management system combines the selected versions of the document component templates to generate a document template. The generated document template is stored in the repository as a new version of document templates for the document type.

According to an embodiment, the document management system instantiates documents or document components from templates using machine learning models. The document management system receives information describing a current document workflow having one or more participants. The document management system identifies a document template based on the document workflow. The document management system obtains a document from the document template by repeating the following steps. The document management system identifies a variable used in a document component template of the document template. The document management system generates a feature vector based on information describing the document workflow and provides the feature vector as input to a machine learning model configured to determine a value of the variable. The machine learning model is executed to determine the value of the variable. The document management system replaces the variable with the determined value. Multiple variables of the document template may be replaced with predicted valued to obtain a document based on the document template. Once the document is generated from the document template, the document management system executes subsequent steps of the document workflow using the document.

According to an embodiment, the document component represents a clause, and the variable represents a value specified in the clause such as a numeric value, a date value, an address, and so on. The document component may represent a verification operation such that the variable represents an external data source for accessing data used for performing the verification. The machine learning model is trained to identify an external data source for performing a particular verification operation.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
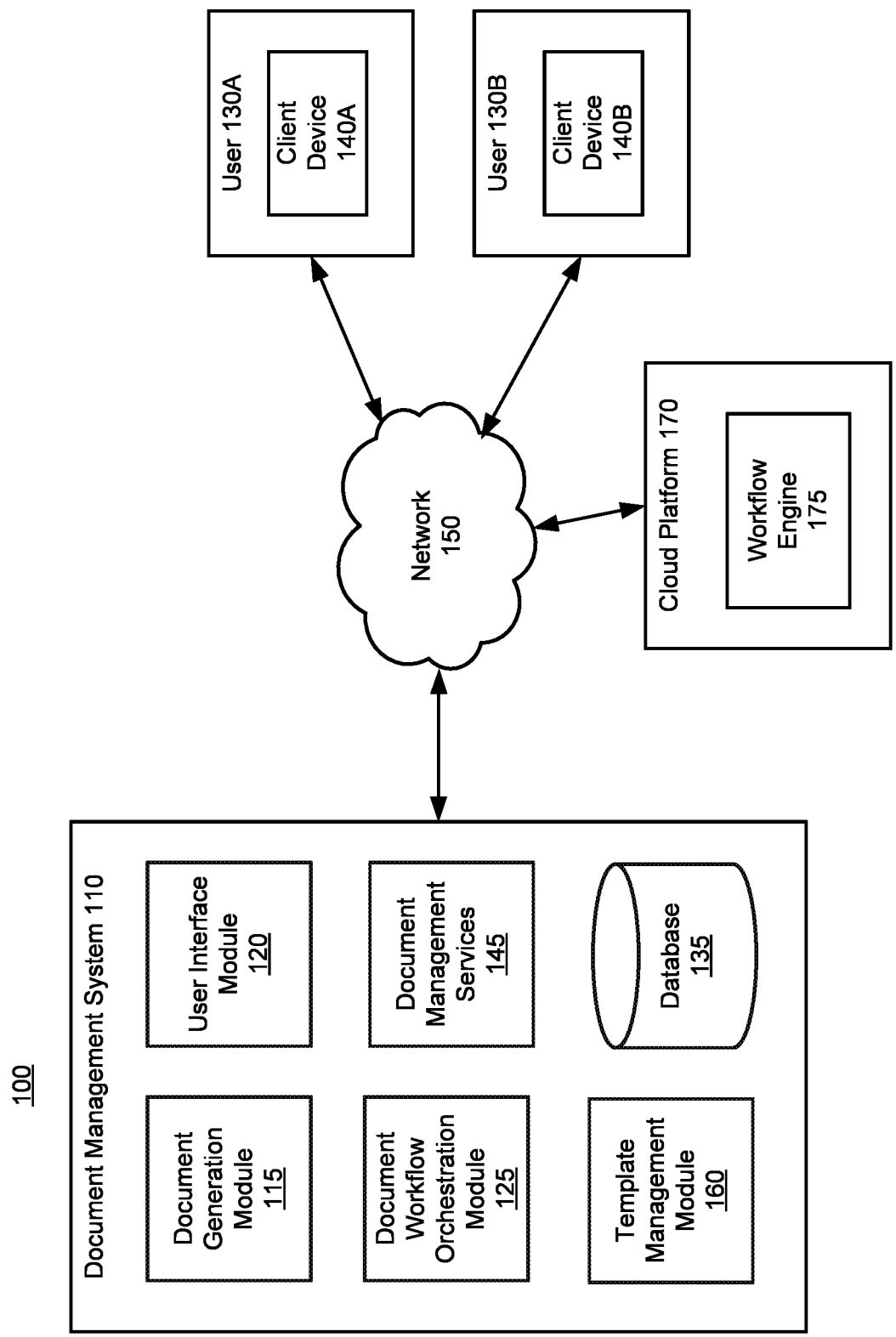
FIG. 1 is a high-level block diagram of a system environment for a document management system, in accordance with an example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

DETAILED DESCRIPTION

A system, for example, a document management system stores documents and manages workflows associated with documents. A document comprises one or more document components. Examples of document components include clauses, verifications, and actions. The document management system stores templates associated with documents. A template may be a document template used for instantiating documents or a document component template used for instantiating specific components of a document. Accordingly, a document template comprises one or more document component templates. The templates may be provided by users, for example, users of the document management system or third-party entities. A template includes text for documents as well as variables representing placeholders that can be instantiated to generate different documents.

The document management system stores different templates for use in different types of document workflows, for example, for different types of interactions between entities. For each template, the document management system may store multiple versions. For example, each version may be provided by a different entity for use in a particular context. The document management system allows discovery of templates based on explicit searches performed by users, for example using a keyword based interface or a natural language interface. The document management system may perform automatic searches based on a context determined by the document workflow.

The document management system stores a context associated with each template. The document management system matches the current context with contexts associated with different versions of templates to identify the most relevant version of the template for use in the current context. If the document management system is unable to find a relevant document template for a current context, the document management system may generate a new document template based on selected versions of document component templates. The generated document template may be stored as a new version.

According to an embodiment, the document management system instantiates documents based on templates by predicting values of variables used in the template based on various factors that describe the context in which the template is being used. The values used for instantiating variables may be predicted using machine learning models that are trained using historical data stored in the document management system. The techniques disclosed herein allow users to generate documents efficiently and make the overall document workflow efficient in terms of user resources as well as computational resources as well as provide data integrity and consistency.

Document Management System Overview

A document management system enables a party (e.g., individuals, organizations, etc.) to create and send documents to one or more receiving parties for negotiation, collaborative editing, electronic execution (e.g., via electronic signatures), contract fulfillment, archival, analysis, and more. For example, the document management system allows users of the party to create, edit, review, and negotiate document content with other users and other parties of the document management system. The document management system allows entities to perform a workflow based on documents. A document workflow may specify a set of actions to be performed using a document. An action performed while executing a document workflow is also referred to as a step of the document workflow. Accordingly, steps of a document workflow include sending the document to another user for approval, signing the document, performing identity verification, configuring and presenting a form for receiving information, initiating a negotiation of the terms of the document, and so on.

The system environment described herein can be implemented within the document management system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, or any suitable digital transaction management platform.

FIG. 1 is a high-level block diagram of a system environment 100 for a document management system 110, in accordance with an example embodiment. The system environment 100 enables users 130A-B to more efficiently generate documents with the document management system 110. As illustrated in FIG. 1, the system environment 100 includes a document management system 110, users 130A, 130B, and corresponding client devices 140A, 140B, each communicatively interconnected via a network 150. In some embodiments, the system environment 100 includes components other than those described herein. For clarity, although FIG. 1 only shows two users 130A, 130B and two client devices 140A, 140B, alternate embodiments of the system environment 100 can have any number of users 130A, 130B and client devices 140A, 140B. For the purposes of concision, the web servers, data centers, and other components associated with an online system environment are not shown in FIG. 1.

The document management system 110 is a computer system (or group of computer systems) for storing and managing documents for the users 130A-B. In some embodiments, the document management system 110 is a distributed system with multiple microservices that provide various functionality. The network 150 may include one or more networks, for example, a local network running within an organization or a virtual private network, and the Internet for connecting the computing systems within the document management system 110 with external systems. For example, users of organization may interact with the document management system 110 via the Internet. Using the document management system 110, users 130A-B can collaborate to create, edit, review, and negotiate documents.

Examples of documents that may be stored, analyzed, and/or managed by the document management system 110 include contracts, press releases, technical specifications, employment agreements, purchase agreements, services agreements, financial agreements, and so on. The document management system 110 further allows users to store templates associated with documents as well as allows discovery of templates associated with documents for various purposes during execution of document workflows by the document management system 110. According to an embodiment, the document management system 110 allows users to publish templates associated with documents so that other users can use them. As a result, the document management system 110 acts as a listing service for templates associated with documents.

The document management system 110 can be a server, server group or cluster (including remote servers), or another suitable computing device or system of devices. In some implementations, the document management system 110 can communicate with client devices 140A-B over the network 150 to receive instructions and send documents (or other information) for viewing on client devices 140A-B. The document management system 110 can assign varying permissions to individual users 130A-B or groups of users controlling which documents each user can interact with and what level of control the user has over the documents they have access to.

The document management system 110 includes a document generation module 115, a user interface module 120, a workflow module 125, a document workflow orchestration module 125, document management services 145, a template management module 160, and a database 135. Computer components such as web servers, network interfaces, security functions, load balancers, failover servers, management and network operations consoles, and the like may not be shown so as to not obscure the details of the system architecture. The document management system 110 may contain more, fewer, or different components than those shown in FIG. 2 and the functionality of the components as described herein may be distributed differently from the description herein.

The database 135 stores information relevant to the document management system 110. The database 135 can be implemented on a computing system local to the document management system 110, remote or cloud-based, or using any other suitable hardware or software implementation. The data stored by the database 135 may include, but is not limited to, documents for analysis and/or execution, client device identifiers (e.g., of the client devices 140A-B), document clauses, version histories, document templates, and other information about documents stored by the document management system 110. Examples of documents stored in the database 135 include but are not limited to: a sales contract, a permission slip, a rental or lease agreement, a liability waiver, a financial document, an investment term sheet, a purchase order, an employment agreement, a mortgage application, and so on.

In some embodiments, the database 135 stores metadata information associated with documents or clauses, such as documents labeled with training data for machine learning models. The document management system 110 can update information stored in database 135 as new information is received, such as new documents and feedback from users. The document management system 110 can update information stored in the database 135 based on user input received from a user interface, via the user interface module 120. Updates to machine learned models are also stored in the database 135.

The document management services 145 may perform predefined operations invoked by a document workflow. These include signing service, identity verification service, form generation service, and so on. According to an embodiment, the document workflow orchestration module 125 invokes APIs (application programming interfaces) for executing any of the document management services 145. The document workflow orchestration module 125 may invoke an API remotely for executing a document management service 145 in a workflow engine 175 executing in a cloud platform 170 distinct from the system executing the document management services 145. A workflow engine 175 may include one or more modules of a document management system 110 that execute steps of document workflow. For example, the workflow engine 175 may include one or more document management services 145 that performs actions performed during document workflows such as signing of documents, identity verification, form generation, document generation from metadata, receiving data from a data source, sending a message to a user, or storing a record in a database (e.g., database 135), and so on. The functions of a workflow engine 175 may be executed by invoking application programming interfaces (APIs) of the workflow engine 175. For example, a document workflow orchestration module 125 may remotely execute operations supported by one or more workflow engines 175 to complete execution of a document workflow across multiple workflow engines, each executing on a distinct cloud platform. The document workflow may include actions associated with a document including, but are not limited to, approving the document, finalizing the document, signing the document, providing the document to another user, revising the document, and so on.

The template management module 160 performs various operations related to document templates. In an embodiment, the operations include creating templates, discovery of templates, instantiation of templates to generate documents based on templates, and storage of templates. The template management module 160 may process templates for different types of documents including employment agreements, distribution agreements, sales agreements, non-disclosure agreements, leases, promissory notes, and so on. Details of the template management module 160 are further illustrated in FIG. 2 and described in connection with FIG. 2.

The document generation module 115 creates documents based on templates. According to an embodiment, the document generation module 115 automatically generates a form interface with fields for completion. The form interface displays fields that correspond to the user selected candidate document tags and enable input as to specific terms of the document. In some embodiments, the document generation module 115 generates and displays a list of suggested fields corresponding to additional candidate document tags that were not selected by the user. The document generation module 115 accesses data values for each of the fields displayed on the form interface. Each data value corresponds to one or more candidate document tags and may be manually input by the user. In some embodiments, the document generation module 115 accesses the data values from a relational database and/or other forms of structured data. Once the form interface is completed, the document generation module 115 creates a document preview for the user.

The user interface (UI) module 120 generates user interfaces allowing users (e.g., the users 130A-B) to interact with the document management system 110. The UI module 120 displays and receives user input for the embedded tagging interface, the form interface, and the workflow interface in the document management system 110. The UI module 120 also provides a user interface for users to add, delete, or modify the contents of a document template, document preview, or finalized document based on permission definitions. Additionally, in some embodiments, the UI module 120 may provide a user interface that allows users to modify content such as text, images, links to outside sources of information such as databases, and the like.

Each client device 140A-B is a computing device capable of transmitting and/or receiving data over the network 150. Each client device 140A-B may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, the client devices 140A-B include an application through which the users 130A-B may access the document management system 110. The application may be a stand-alone application downloaded by the client devices 140A-B from the document management system 110. Alternatively, the application may be accessed by way of a browser installed on the client devices 140A-B and instantiated from the document management system 110. The client devices 140A-B enables the users 130A-B to communicate with the document management system 110. For example, the client devices 140A-B enables the users 130A-B to access, review, execute, and/or analyze documents within the document management system 110 via a user interface. In some implementations, the users 130A-B can also include applications (which may include AI-based implementations), bots, scripts, or other processes implemented using a computing device and set up to interact with the document management system 110 in some way. According to some embodiments, the users 130A-B are associated with permissions definitions defining actions users 130A-B can take within the document management system 110, or on documents, templates, permissions associated with other users and/or workflows.

The network 150 transmits data within the system environment 100. The network 150 may be a local area or wide area network using wireless or wired communication systems, such as the Internet. In some embodiments, the network 150 transmits data over a single connection (e.g., a data component of a cellular signal, or Wi-Fi, among others), or over multiple connections. The network 150 may include encryption capabilities to ensure the security of customer data. For example, encryption technologies may include secure sockets layers (SSL), transport layer security (TLS), virtual private networks (VPNs), and Internet Protocol security (IPsec), among others.

System Architecture of Template Management Module

Figure 2:
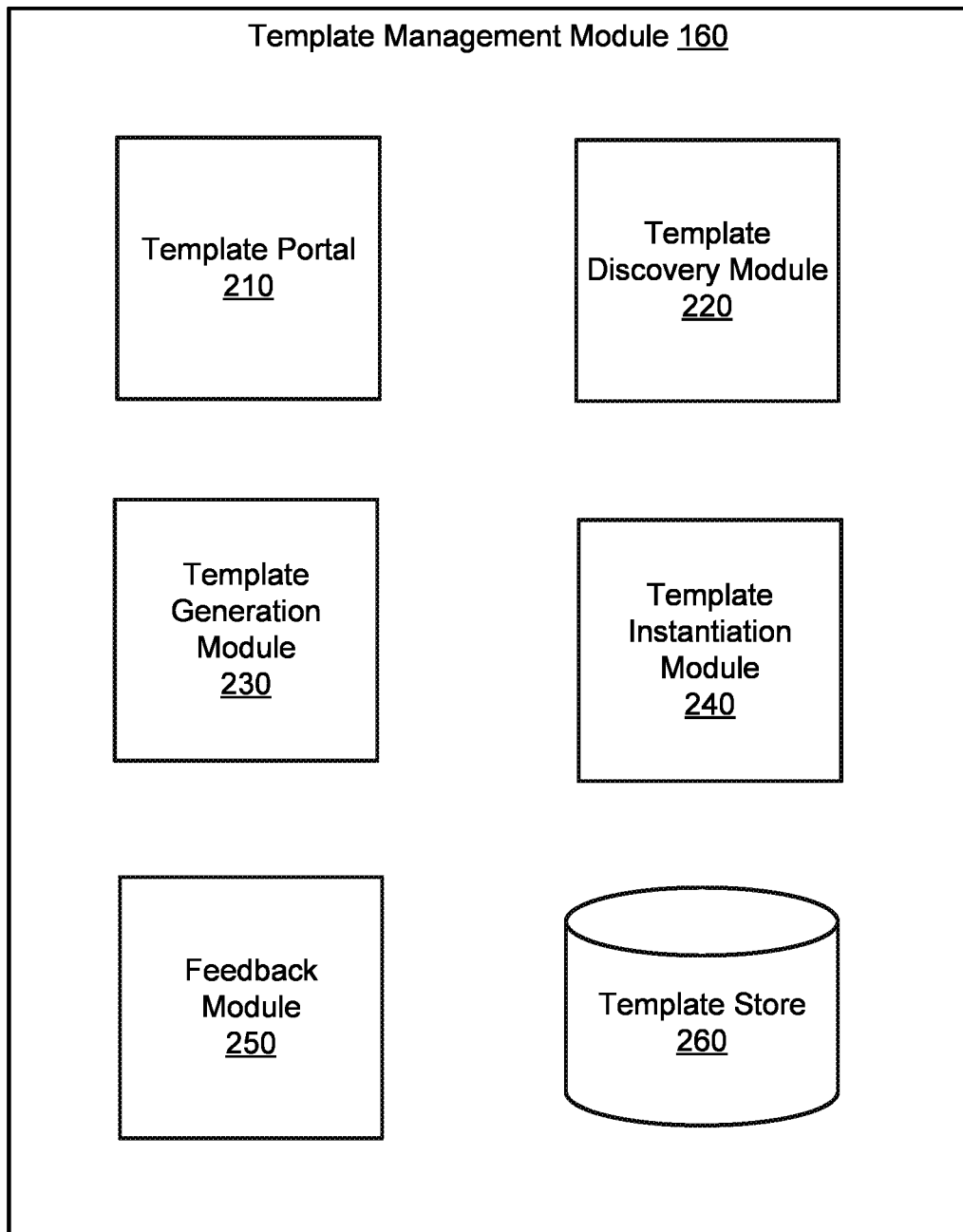
FIG. 2 is a high-level block diagram of a system architecture of a template management module, in accordance with an example embodiment.

FIG. 2 is a high-level block diagram of a template management module, in accordance with an example embodiment. The template management module 160 includes a template portal 210, a template discovery module 220, a template generation module 230, a template instantiation module 240, a feedback module 250, and a template store 260. Other embodiments may include more, fewer, or other modules than those indicated in FIG. 2 and not all modules of the template management module 160 are shown in FIG. 2.

The template portal 210 allows users to perform actions related to templates including submitting new templates and searching for existing templates. For example, third party entities such as organizations using the document management system 110 may provide new templates for use by various entities using the templates. The templates received are stored in the template store 260. The template store 260 may also be referred to herein as a repository of templates including document templates and document component templates. A user associated with an entity using the document management system 110 may search for a template stored in the template store. The template portal 210 may support various types of interfaces for allowing searching of templates, for example, keyword-based searches, metadata-based searches natural language-based searches, and so on. The template portal 210 may configure a user interface that can be used by users for searching for templates. The template portal 210 may support application programming interfaces (APIs) for searching for templates in addition to other functionalities for usage by third party resources and systems.

The template discovery module 220 receives and processes the search requests for templates. A search request may be received from the template portal 210, for example, requests generated by a user interface configured for receiving search requests and providing search results. The template discovery module 220 receives search criteria and identifies a set of templates matching the search criteria. The template discovery module 220 ranks the set of templates based on relevance of each template based on a context in which the search was performed. Ranking may be determined by a plurality of means and may be configured by users. The template discovery module 220 may provide a ranked list of templates or select the highest-ranking template (or templates) based on the ranking and provides the result to the requestor.

The template generation module 230 generates templates and stores the generated templates in the template store 260. The template generation module 230 may generate a document template from a set of document components templates and store the generated template in the template store 260. The process for generating a document template from document components templates is described in further details herein.

The template instantiation module 240 instantiates a template to generate a document or a portion of a document for use by the document management system 110. For example, given a context within a document workflow, the template instantiation module 240 may generate a document from a document template and provide for use by subsequent steps of the document workflow. According to an embodiment, the template instantiation module 240 uses a machine learning model for predicting a value of a template variable for instantiating the template. The template instantiation module 240 trains the machine learning model using training data generated based on historical data, for example, values used in the past for instantiating variables of templates. The historical data may be obtained from system logs that store operations associated with documents performed by the document management system. The process for instantiating a template is described in further detail herein.

The feedback module 250 receives feedback associated with a template based on actions performed by users during execution of a document workflow. For example, actions performed as a result of using a document based on a document template result in generation of data or records that may be further stored in the document management system. Other downstream actions may be performed during a workflow based on the document and the information describing these actions is received as feedback and stored in the document management system 110. This feedback may be used for refining the templates. For example, the document management system 110 may revise the content of the templates based on the feedback received. The document management system 110 may modify the context associated with a template based on the feedback, thereby modifying the discovery of the templates. The document management system 110 may modify the categories of templates stored in the template store 260 based on the feedback. The document management system 110 may use the feedback received for evaluation and training of machine learning models used for generation of templates as well as for instantiation of template variables.

As mentioned above, the template store 260 stores various templates. According to an embodiment, the template store 260 creates and stores an index that allows searching of the templates based on the context. The index maps representations of contexts associated with templates to the templates. For example, a feature vector representation of a context is mapped to a template that is relevant to that context. Accordingly, the index allows the document management system 110 to efficiently discover templates for a given context by generating a feature vector (or any other) representation of the current context and matching the current context against stored contexts of the index to find the closest matching template relevant to the current context.

Figure 3:
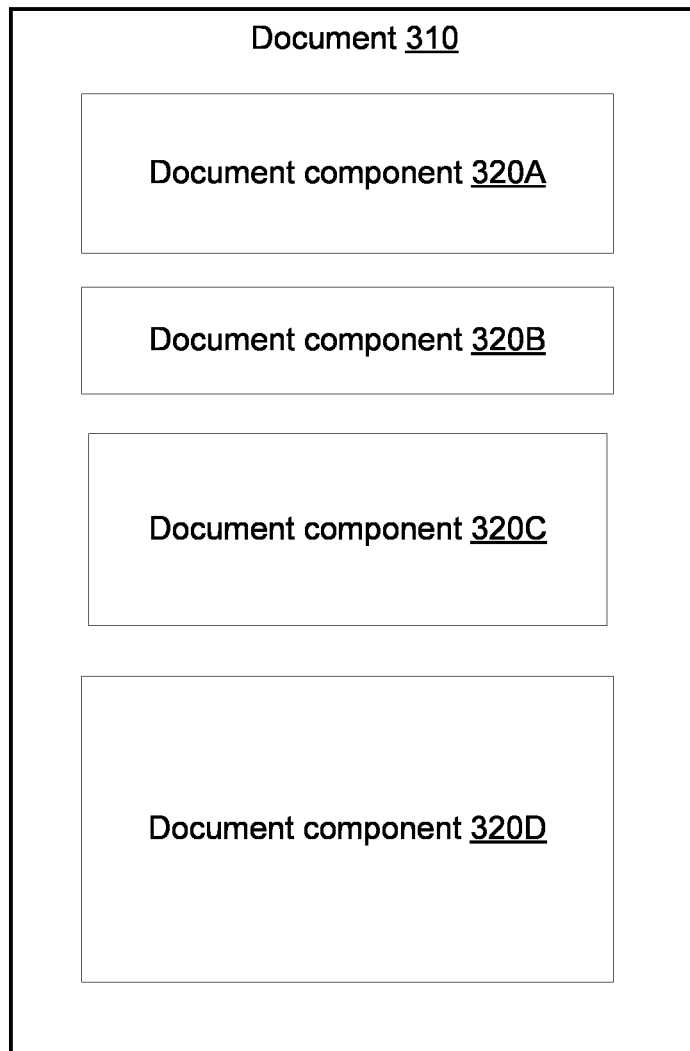
FIG. 3 is a diagram illustrating a document comprising a set of document components, in accordance with an example embodiment.

FIG. 3 is a diagram illustrating a document comprising a set of document components, in accordance with an example embodiment. As shown in FIG. 3, a document 310 may include one or more document components, for example, document components 320A, 320B, 320C, and 320D. A document may represent an agreement or a contract. A document template is also referred to herein as an agreement template. A document component may also be referred to herein as an element or a module. A document component may include text, for example, sections comprising rich-text paragraphs, ordered sections, tables, cross-references, calculated fields, conditional and mutually exclusive sections, dynamically generated content, and so on.

An example of a document component is a clause. In some embodiments, a clause corresponds to a legal clause, a business clause, financial agreement text, and the like. For example, a given document may include multiple clauses that each correspond to a different header within the document. A clause may be associated with a document component type that characterize content of the clause. Examples of document component types for a clause include but are not limited to an indemnity clause, a merger and integration clause, a severability clause, a fees clause, a damages clause, a pricing clause, a purchase clause, a payment clause, and so on. According to an embodiment, a clause is a smart clause or an active clause that is associated with logic and actions or steps of workflows. For example, a clause may specify that if certain conditions are true, certain actions should be performed, for example, generating a record in a database, sending a notification, for example, an email or message to a user, and so on.

A clause may represent a contractual obligation, for example, the completion of certain tasks, avoidance of certain acts, delivery of products or services, and payment. The document management system 110 tracks whether the contractual obligation is performed. Parties that fail to fulfill their obligations may face legal consequences. The document management system tracks obligations and notifies parties whether or not their obligations are performed so the parties can determine their risks in a document workflow. According to an embodiment, a clause is programmable and is associated with a set of instructions. Programmable clause functionality may involve specifying conditional statements, importing data from a particular source, exporting data to a particular source, performing calculations or routines, configuring the programmable clause, or using any suitable programmable clause feature. The document management system 110 performs various operations including collection of data, verification of programmable clause logic, updating of legal contracts and their clauses, storage of data, exporting of data, and communication with external resources/services.

Another example of a document component is an action, for example, sending an email to a user. An action may represent an operation performed on an external system (for example, sending a message, executing an API of an external system, invoking an external service and so on) or an operation performed on a document component (for example, updating a value within a document, updating a text of the document, and so on). An action specified in a document may represent certain steps of a document workflow performed by the document management system in association with the document. These steps may represent receiving certain data values in the document, sending certain data values to an external system or user, waiting for certain action to get performed for example, waiting to receive an electronic signature from a user, and so on.

Another example of a document component is a verification representing a portion of the document that allows data values to be verified against a service, for example, a third-party service. For example, values describing entities can be verified against a database storing information describing the entities, values representing addresses may be verified against a mapping service, usernames and information describing users may be verified against a user account store, an address may be verified using a mapping service, and so on.

A document component has a document component type. A document component type is associated with a document component template stored in the template store 260. The document component template for a document component type may have multiple versions stored in the template store 260. Multiple document component templates may be combined by the document management system 110 or by users interacting with the document management system 110 to generate document templates.

Overall Process

Figure 4:
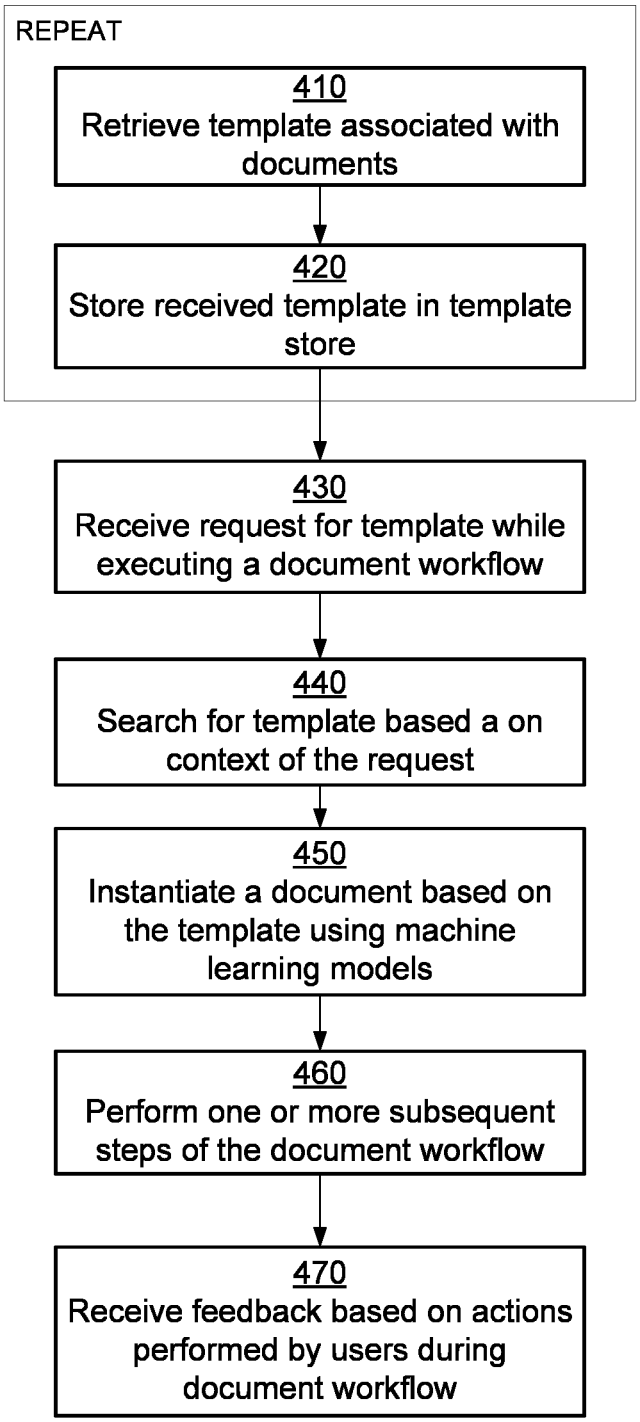
FIG. 4 is a flowchart illustrating a process for storing and using templates associated with documents, in accordance with an example embodiment.

FIG. 4 is a flowchart illustrating a process 400 for storing and using templates associated with documents, in accordance with an example embodiment. Other embodiments may execute the steps shown in the flowchart of FIG. 4 in an order different from that indicated in the figure.

The document management system 110 repeats the steps 410 and 420 one or more times. The document management system 110 receives 410 templates associated with documents. The templates may be provided by users associated with entities that use the document management system 110, for example, third-party organizations. A template received may be a document template or a document component template. The document management system 110 stores 420 the received template in the template store 260. The template may be stored as a new version of a template for a document of a particular document type or a document component template for a document component type. New templates may be received as an ongoing process, for example, during or after other steps of the process shown in FIG. 4 are performed.

The document management system 110 further receives 430 a request for a template. The request may be received from a user. For example, a user may be designing a document template and perform a search for a particular document component template. Alternatively, the request may be automatically generated by the document management system 110 while performing a document workflow. For example, during a particular step of a document workflow, the document management system 110 determined the context based on information including categories of participants of the document workflow, the steps previously executed as part of the document workflow, the current step being executed, and so on and generates a request for a document template or a document component template based on the context. The document management system 110 performs a search 440 for templates based on the context. The search identifies a particular version of a document template for a document or a document component.

Once the template is identified in a given context, the document management system 110 instantiates 450 a document based on the identified template. Accordingly, the document management system 110 determines values of one or more variables of the template. According to an embodiment, the document management system 110 uses machine learning models for determining the value of a variable to be used in the document.

The document management system 110 may perform 460 subsequent steps of the document workflow being performed. One or more users participating in the document workflow perform actions associated with the document, for example, provide e-signature for the document. The document management system 110 receives 470 feedback based on actions performed by the users during the document workflow. The document management system 110 may use the feedback to evaluate or train machine learning models used for generation of templates or instantiation of documents using templates.

Discovery of Templates

Figure 5:
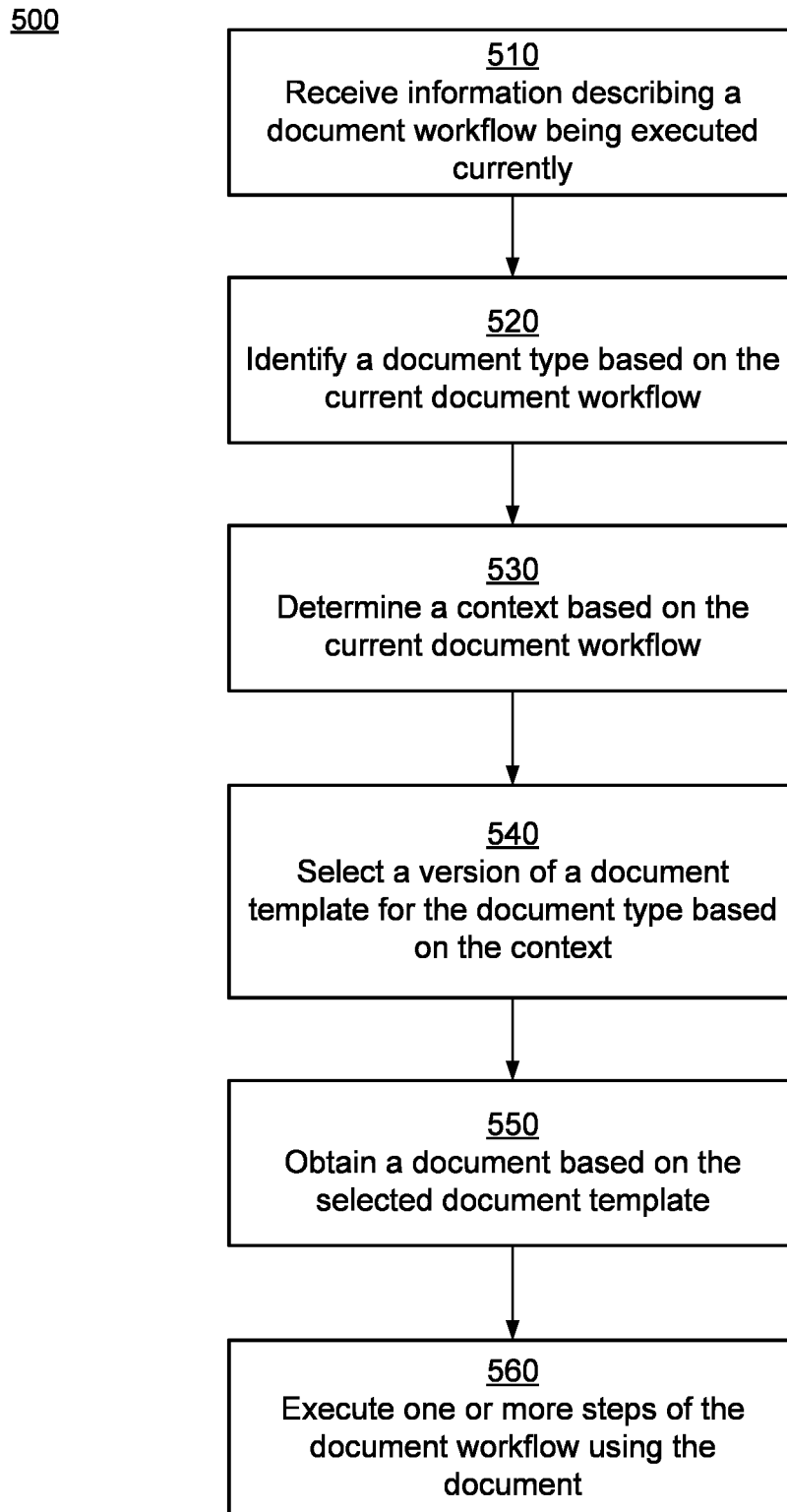
FIG. 5 illustrates a process for searching relevant templates in a context associated with a document workflow, in accordance with an example embodiment.

FIG. 5 illustrates a process 500 for searching relevant templates in a context associated with a document workflow, in accordance with an example embodiment. Other embodiments may perform the steps of the process in an order different from that indicated in FIG. 5.

The document management system 110 receives 510 information describing a document workflow being currently executed by the document management system 110. The information includes the participants of the workflow, the type of interaction being performed during the workflow, and so on. For example, the document workflow may concern a type of contract or agreement between two or more participants.

The document management system 110 identifies 520 a document type based on the current document workflow. For example, if the interaction represented by the document workflow represents a certain type of agreement between two participants, the document management system 110 identifies a document type corresponding to the agreement. According to an embodiment, the document management system 110 stores a mapping from various types of interactions corresponding to different document workflows and document types. For example, if the document workflow represents an interaction between a tenant and a landlord, the document type may be a lease agreement, if the document workflow represents a merger between two enterprises, the document type may be a merger agreement, and so on.

The document management system 110 determines 530 a context based on the current document workflow. The representation of a context may include attributes that store values describing the context, for example, attributes describing the entities representing participants of the workflow. The context may store attributes describing the participants, for example, whether a participant is an individual user or an organization, the category of organization if the participant is an organization, a location of the participant, past actions performed by the participant using the document management system, and so on. The category of an organization may represent a type of activity performed by the organization, for example, a type of business performed by the organization. The relevance of a version of a template for a given context may be further determined based on factors including data about past usage of document types, document components, and templates, e.g., historical performance of a contract based on time spent in negotiation, dispute rates, or litigation results. This data is used for discovery of templates and also for generating document templates for users based on user contexts and needs as described herein.

According to an embodiment, the context is represented as a nested data structure conforming to a predefined schema, for example, a JSON (JavaScript object notation) object conforming to a JSON schema. According to another embodiment, the context is represented as a feature vector comprising various values describing the document workflow, participants, the current step of the document workflow being executed, and so on. According to an embodiment, the document management system 110 provides information describing the context as an input to a neural network and extracts embeddings generated by a hidden layer of the neural network and uses the embeddings as the feature vectors representing the context. The neural network may be an autoencoder trained to receive a representation of a context, generate a lower dimensional representation of the context, and regenerate the received representation of the context from the lower dimensional representation. The lower dimensional representation may be used as a feature vector representation of the input context.

The document management system 110 stores multiple versions of the document template of each document type. The document management system 110 selects 540 a version of a document template of the document type identified 520. According to an embodiment, the document management system 110 stores a context corresponding to each version of the document template. The context corresponding to a version of the document template may be determined based on the context used when the version of the document template was created and stored. According to an embodiment, the template store 260 stores an index that maps representations of context to versions of document templates. The index allows selection of versions of document templates that have a context stored in the template store 260 that is similar to an input context. For example, the document management system 110 matches the received context based on the current document workflow and compares the received context against contexts stored in the template store 260 corresponding to versions of document templates. The document management system 110 may match contexts based on a vector distance between representations of contexts, for example, an L2 norm. An input context C1 matches a context C2 of a document template stored in the template store 260 if the vector distance between the two contexts is below a threshold or if the distance between the two contexts is the least distance compared to distances of the input context with other contexts stored in the template store 260 in association with versions of the document template.

The document management system 110 obtains 550 a document based on the selected version of the document template. According to an embodiment, the selected version of the document template is presented to a user and the user may specify values of variables of the template to instantiate a document based on the document template. According to another embodiment, the document management system 110 uses machine learning based models trained to predict values of variables based on the context in which the template is being used to determine values of variables of the template. Details of this process is further described herein in connection with FIG. 8.

The document management system 110 executes 560 one or more subsequent steps of the document workflow using the document obtained 550. These actions may involve steps performed by participants of the document workflow. The actions may perform steps of a transaction, for example, storing records in the document management system 110, updating existing records, sending notifications to users, waiting for a user to perform an action such as providing an electronic signature in the document, and so on.

According to an embodiment a process similar to that described in FIG. 5 may be used for selecting a version of a document component template for a particular component type. The document management system 110 stores multiple versions of document component template of a particular document component type. The document management system 110 selects a version of a document component template of the document component type identified. The document management system 110 stores a context corresponding to each version of the document component template. The context corresponding to a version of the document component template may be determined based on the context used when the version of the document component template was created and stored. According to an embodiment, the template store 260 stores an index that maps representations of context to versions of document component templates. The index allows selection of versions of document component templates that have a context stored in the template store 260 that is similar to an input context. For example, the document management system 110 matches the received context based on the current document workflow and compares the received context against contexts stored in the template store 260 corresponding to versions of document component templates. The document management system 110 may match contexts based on a vector distance between representations of contexts, for example, an L2 norm. An input context C1 matches a context C2 of a document component template stored in the template store 260 if the vector distance between the two contexts is below a threshold or if the distance between the two contexts is the least distance compared to distances of the input context with other contexts stored in the template store 260 in association with versions of the document component template.

Generation of Templates

Figure 6:
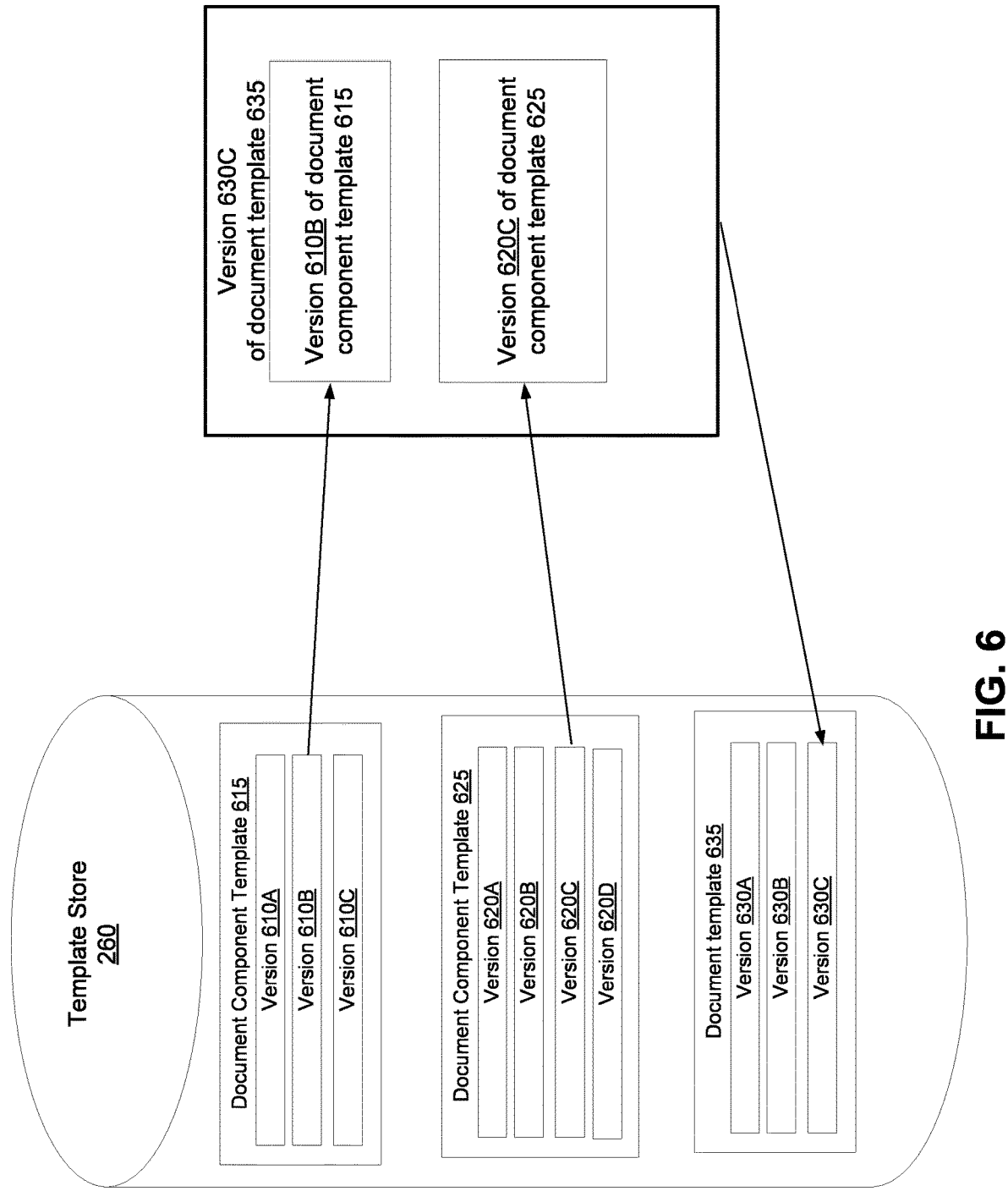
FIG. 6 is a diagram illustrating generation of a document template, in accordance with an example embodiment.

FIG. 6 is a diagram illustrating generation of a document template, in accordance with an example embodiment. The template store 260 stores versions of templates including document component templates 615, 625 and document template 635. For example, the template store 260 stores versions 610A, 610B, 610C as versions of document component template 615; versions 620A, 620B, 620C, 620D as versions of document component template 625; and versions 630A, 630B as versions of document template 635. The document management system 110 generates a new version of document template 635 using versions of document component template. For example, the document management system 110 determines that a document template 625 is needed in a current context since the document template 635 corresponds to a document type relevant to the current context. The document management system 110 further determines that the existing versions of the document template 635 are not suitable for use in the current context and determines that a new version of the document template should be generated. The document management system 110 determines that the document template 635 of a particular document type includes a document component template and a document component template 625. The document management system 110 selects the appropriate versions of the document component templates 615 and 625 for the current context, for example, based on a process similar to that shown in FIG. 5. For example, the document management system 110 determines that version 610B of document component template 615 and version 620C of document component template 625 is relevant to the current context. The document management system 110 generates a new version 630C of the document template comprising version 610B of document component template 615 and version 620D of document component template 625. The document management system 110 stores the generated version 630C of the document template 635 in the template store. The document management system 110 stores the current context as the context associated with the version 630C. The generated version 630C of document template 635 may be used by subsequent users if they encounter a context matching the context associated with version 630C. A new document template may be generated responsive to an explicit request by a user, for example, if a user decides to create a particular version of a document template for a particular document type. The user may store the document template in the template store for subsequent user by other users. Similarly, such a user may add a new version of a document component template. The user may be a user of the document management system, for example, a tenant that uses the services of the document management system or the user may be a third party entity that does not use services of the document management system.

Figure 7:
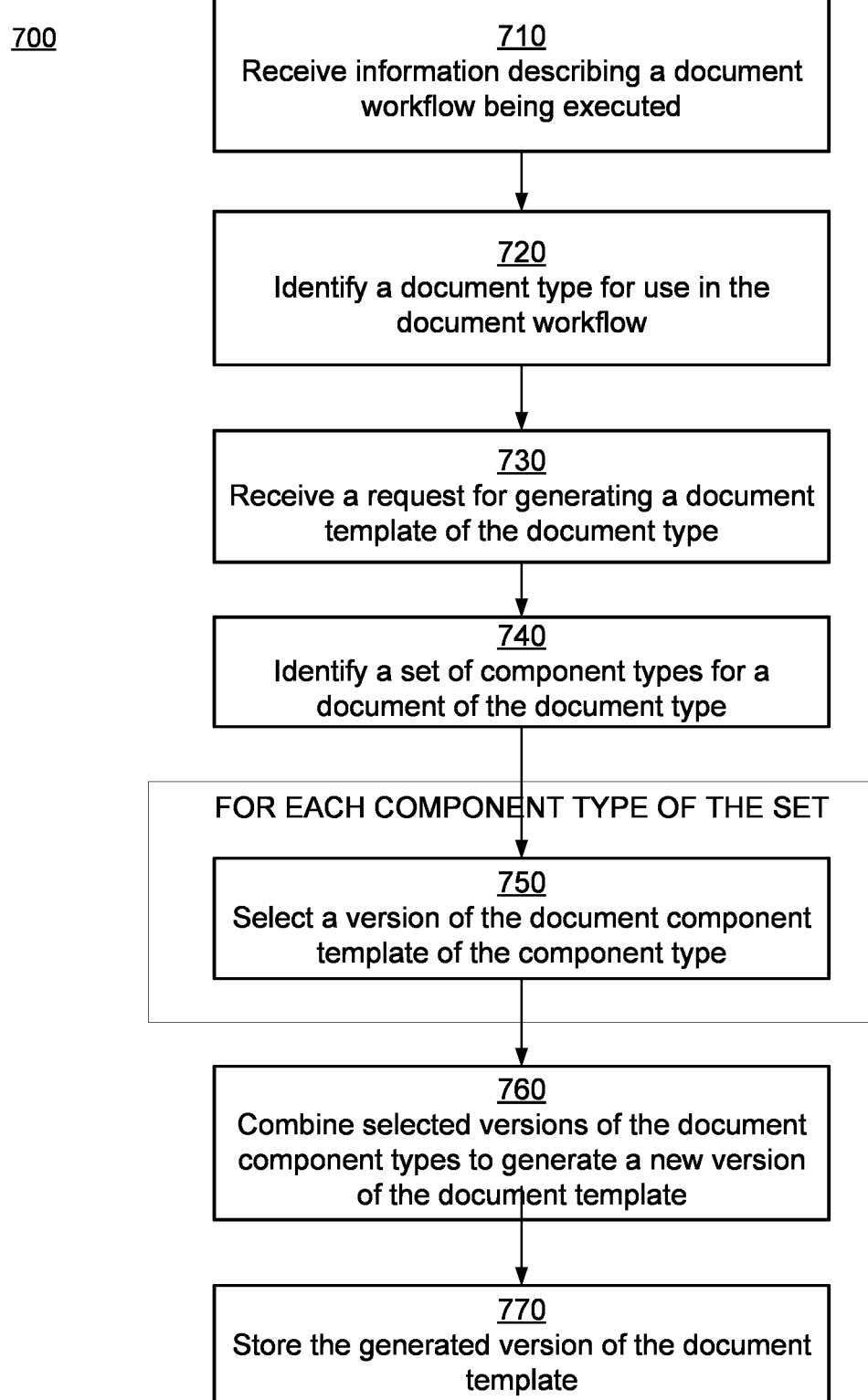
FIG. 7 illustrates a process for generating a document using templates, in accordance with an example embodiment.

FIG. 7 illustrates a process 700 for generating a document using templates, in accordance with an example embodiment. The steps of the process may be performed in an order different from that indicated in FIG. 7.

The document management system 110 receives 710 information describing a document workflow currently being executed. The information may include participants of the workflow, steps executed so far in the document workflow, the step currently being executed by the document workflow, and so on.

The document management system 110 identifies 720 a document type for use in the document workflow. The document type may depend on the type of participants interacting via the document workflow, the overall goal of the document workflow, and other factors. The document management system 110 receives 730 a request for generating a document template of the document type. The request may be received from a user or may be automatically generated by the document management system 110 based on the current context of execution of the document workflow. For example, the document management system 110 may determine that existing document templates for the document type are not suitable for use in the current context.

The document management system 110 identifies 740 one or more component types of for the document template type, i.e., component types of components of documents of the document template type. For example, documents of a particular document template type may include specific types of clauses, verifications, and actions.

For each component type of the one or more component types, the document management system 110 selects 750 a version of a document component template of the document component type. The document management system 110 may use the process described in FIG. 5 for selecting a version of the document component template.

The document management system 110 combines 760 the selected document component templates to generate a document template. The document management system 110 stores 770 the generated document template as a new version of the document type. The stored version of a document template is associated with a context in which the template was used. This facilitates discovery of the template based on a subsequent context during a workflow being executed by the document management system.

Instantiation of Documents Based on Templates

Figure 8:
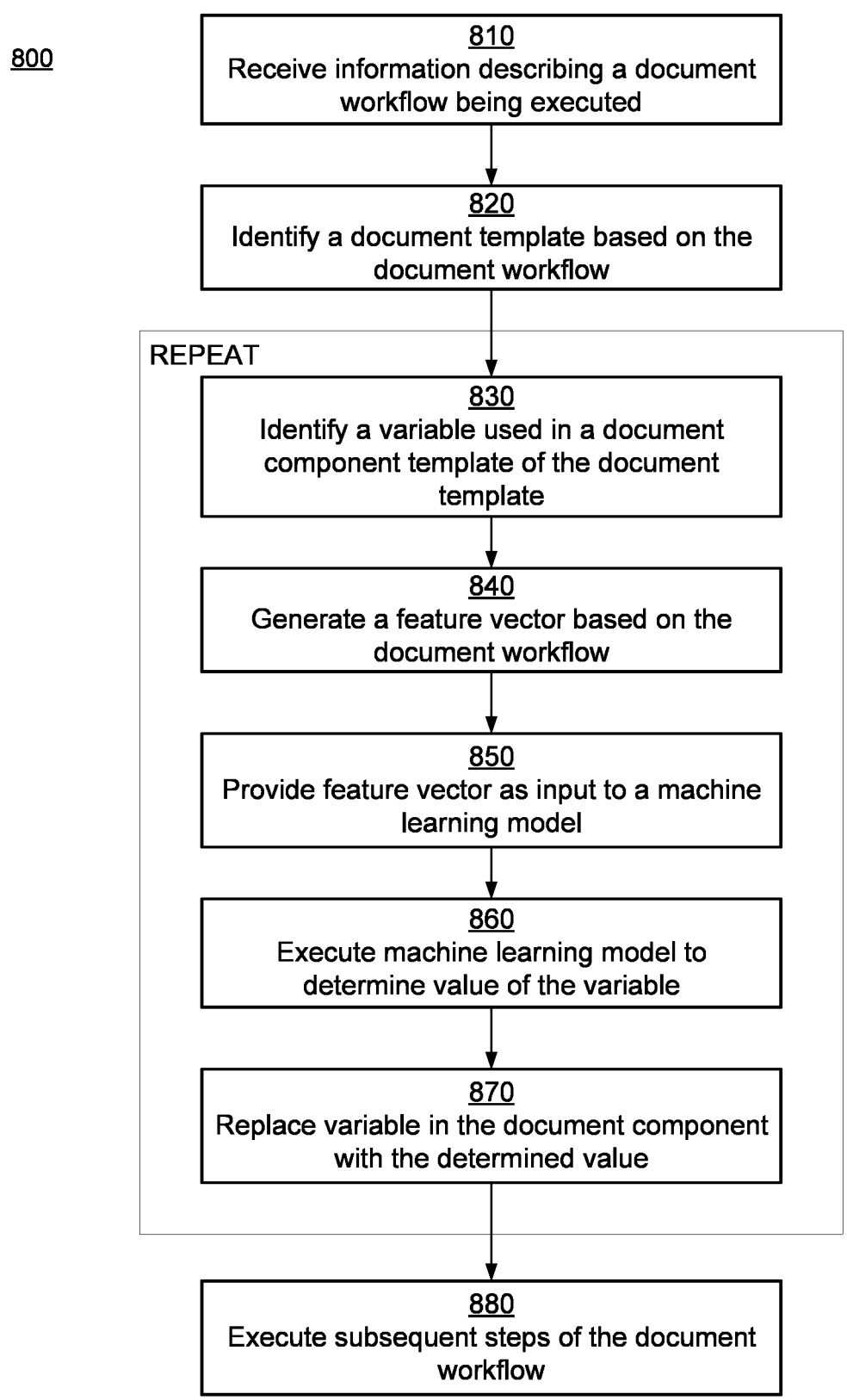
FIG. 8 illustrates a process for instantiating a document generated using templates, in accordance with an example embodiment.

FIG. 8 illustrates a process 800 for instantiating a document generated using templates, in accordance with an example embodiment. The steps of the process may be performed in an order different from that indicated in FIG. 8. The document management system 110 uses artificial intelligence for predicting values of variables used in templates.

According to an embodiment, the document management system 110 instantiates document templates using machine learning models to generate a document. The machine learned model may be trained using supervised or unsupervised machine learning. Different machine learning techniques may be used in various embodiments, such as linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

The document management system 110 receives 810 information describing a current document workflow being executed by the system. The current document workflow has one or more participants. The document management system 110 identifies 820 a document template based on the document workflow.

The document management system 110 obtains a document from the document template by repeating one or more times the steps 830, 840, 850, 860, 870. The document management system 110 identifies 830 a variable used in a document component template of the document template. The document management system 110 generates 840 a feature vector based on information describing the document workflow. The document management system 110 provides 850 the feature vector as input to a machine learning model configured to determine a value of the variable. The document management system 110 executes 860 the machine learning model to determine the value of the variable. The document management system 110 replaces 870 the variable with the determined value. Once all the variables of a document template are replaced with values, the document template becomes an instance of a document.

Once the document is generated from the document template, the document management system 110 executes 880 one or more subsequent steps of the document workflow using the document.

The variables of a template may store different types of values. Accordingly, different machine learning models are trained to predict different types of values and for different contexts. For example, a variable may store a numeric value used in a document, for example, an amount specified for payment by a participant to another participant in a workflow, a quantity of an item, a length of time interval for performing a task. A machine learning model is trained to receive as input, information describing the participants, various actions performed so far in the workflow, and so on, and predicts a numeric value of the variable. The machine learning model is trained using historical data representing past numeric values used by various parties in different contexts.

According to an embodiment, a variable represents a data source used for performing certain actions in the document, for example, the data source may be a service used for performing certain verification in the document. A machine learning model is trained to determine a data source represented by a variable in a given context. The machine learning model is trained based on historical data identifying different data sources or services used in different contexts. According to an embodiment, the machine learning model receives as input a representation of the current context and metadata describing a data source, for example, the category of the data provided by the data source. The machine learning model predicts a relevance score indicating the relevance of the input data source to the input context. The document management system 110 receives multiple data sources for a given context and determines the relevance score for each data source. The document management system 110 ranks the data sources based on their relevance and selects the most relevant data source based on the ranking for specifying the value of the variable.

According to an embodiment, a variable represents an action, for example, a subsequent step to be performed by the document workflow, creating a subscription of a service, invoking an API (application programming interface) of a service to perform certain operation using the service, and so on. A machine learning model is trained to determine the action represented by a variable in a given context. The machine learning model is trained based on historical data identifying different actions performed in different contexts. According to an embodiment, the machine learning model receives as input a representation of the current context and a representation of an action. The machine learning model predicts a relevance score indicating the relevance of the action to the input context. The document management system 110 identifies multiple actions relevant to a given context and determines the relevance score for each action. The document management system 110 ranks the actions based on their relevance and selects the most relevant action based on the ranking for specifying the value of the variable. According to an embodiment, the machine learning model is trained to predict responses for the variables within the template based on the context of the transaction/workflow, the participants, the document type, etc. and associated histories that the machine learning model has access to.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
   selecting a document template automatically based on a document workflow;
   identifying a variable used in a document component of the document template;
   generating a feature vector based on information associated with the document workflow;
   providing the feature vector as input to a machine learning model to determine a value of the variable used in the document component;
   replacing the variable with the determined value; and
   generating a document from the document template and the document component with the determined value.

2. The method of claim 1, wherein the document component represents a clause, and the variable represents a value specified in the clause.

3. The computer-implemented method of claim 1, wherein the document component represents a verification, and the variable represents one or more of a data source for performing verification of data in the document or a value returned by a data source.

4. The computer-implemented method of claim 1, wherein the document component represents an action specified in the document, the action representing an operation performed on an external system or an operation performed on a document component.

5. The computer-implemented method of claim 1, wherein the document component represents a verification operation, and the variable represents an external data source for accessing data used for performing the verification, wherein the machine learning model is trained to identify an external data source for performing a particular verification operation.

6. The computer-implemented method of claim 1, wherein the feature vector stores attributes representing information describing participants of the document workflow, a type of document workflow, or information describing operations of the document workflow.

7. The computer-implemented method of claim 1, comprising:
 identifying a document type based on the document workflow; and
 selecting a version of the document template of the document type.

8. The computer-implemented method of claim 7, comprising executing one or more operations of the document workflow using the document.

9. A non-transitory computer-readable storage medium storing executable instructions that, when executed by one or more computer processors, cause the one or more computer processors to:
 select a document template automatically based on a document workflow;
 identify a variable used in a document component of the document template;
 generate a feature vector based on information associated with the document workflow;
 provide the feature vector as input to a machine learning model to determine a value of the variable used in the document component;
 replace the variable with the determined value; and
 generate a document from the document template and the document component with the determined value.

10. The non-transitory computer-readable storage medium of claim 9, wherein the document component represents a clause, and the variable represents a value specified in the clause.

11. The non-transitory computer-readable storage medium of claim 9, wherein the document component represents a verification, and the variable represents one or more of a data source for performing verification of data in the document or a value returned by a data source.

12. The non-transitory computer-readable storage medium of claim 9, wherein the variable represents an action specified in the document, the action representing an operation performed on an external system or an operation performed on the document component.

13. The non-transitory computer-readable storage medium of claim 9, wherein the document component represents a verification operation, and the variable represents an external data source for accessing data used for performing the verification, wherein the machine learning model is trained to identify an external data source for performing a particular verification operation.

14. The non-transitory computer-readable storage medium of claim 9, wherein the feature vector stores attributes representing information describing participants of the document workflow, type of document workflow, or information describing operations of the document workflow.

15. The non-transitory computer-readable storage medium of claim 9, comprising instructions to:
 identify a document type based on the document workflow; and
 select a version of the document template of the document type.

16. A computer system comprising:
 memory to store instructions; and
 processing circuitry communicatively coupled to the memory, the processing circuitry to execute the instructions to:
  select a document template automatically based on a document workflow;
  identify a variable used in a document component of the document template;
  generate a feature vector based on information associated with the document workflow;
  provide the feature vector as input to a machine learning model to determine a value of the variable used in the document component;
  replace the variable with the determined value; and
  generate a document from the document template and the document component with the determined value.

17. The computer system of claim 16, wherein the document component represents a clause, and the variable represents a value specified in the clause.

18. The computer system of claim 16, wherein the document component represents a verification, and the variable represents one or more of a data source for performing verification of data in the document or a value returned by a data source.

19. The computer system of claim 16, wherein the variable represents an action specified in the document, the action representing an operation performed on an external system or an operation performed on a document component.

20. The computer system of claim 16, wherein the document component represents a verification operation, and the variable represents an external data source for accessing data used for performing the verification, wherein the machine learning model is trained to identify an external data source for performing a particular verification operation.

* * * * *